United States Patent
Herdier et al.

(10) Patent No.: US 9,546,690 B2
(45) Date of Patent: Jan. 17, 2017

(54) FIBER SENSOR ASSEMBLY

(71) Applicant: AKTIEBOLAGET SKF, Göteborg (SE)

(72) Inventors: Romain Herdier, Uccle (FR); Defeng Lang, Delft (NL); Hongyu Yang, Houten (CN)

(73) Assignee: AKTIEBOLAGET SKF, Gothenburg (SE)

( * ) Notice: Subject to any disclaimer, the term of this patent is extended or adjusted under 35 U.S.C. 154(b) by 46 days.

(21) Appl. No.: 14/652,233

(22) PCT Filed: Dec. 14, 2012

(86) PCT No.: PCT/EP2012/075555
§ 371 (c)(1),
(2) Date: Jun. 15, 2015

(87) PCT Pub. No.: WO2014/090332
PCT Pub. Date: Jun. 19, 2014

(65) Prior Publication Data
US 2015/0323013 A1    Nov. 12, 2015

(51) Int. Cl.
*F16C 41/00* (2006.01)
*F16C 43/04* (2006.01)
*F16C 19/52* (2006.01)
*G01M 11/08* (2006.01)
*G01D 5/353* (2006.01)
*G01M 13/04* (2006.01)
(Continued)

(52) U.S. Cl.
CPC ............ *F16C 41/00* (2013.01); *F16C 19/522* (2013.01); *F16C 43/04* (2013.01); *G01B 11/16* (2013.01); *G01D 5/353* (2013.01); *G01D 5/35316* (2013.01); *G01L 1/242* (2013.01); *G01L 1/246* (2013.01); *G01L 5/0009* (2013.01); *G01M 11/085* (2013.01); *G01M 13/04* (2013.01); *G01D 11/02* (2013.01); *G02B 6/3636* (2013.01); *Y10T 29/4968* (2015.01)

(58) Field of Classification Search
CPC .................................................. F16C 41/007
See application file for complete search history.

(56) References Cited

U.S. PATENT DOCUMENTS 4,988,219 A *   1/1991  Peilloud ............... F16C 33/723
                                                        324/174
6,948,856 B2 *  9/2005  Takizawa .............. F16C 19/525
                                                        384/448
(Continued)

FOREIGN PATENT DOCUMENTS

WO    2009100084 A1    8/2009
WO    2011066926 A1    6/2011

*Primary Examiner* — Thomas R. Hannon
(74) *Attorney, Agent, or Firm* — Bryan Peckjian; SKF USA Inc. Patent Dept.

(57) ABSTRACT

A bearing which includes a bearing ring and rolling elements. The bearing ring includes an outer surface, having a groove around a circumference of the outer surface, wherein the groove is adapted to accommodate a fiber sensor. The bearing further comprises a clamping element, wherein the clamping element retains the fiber sensor with a clamping force acting in a radial direction of the bearing ring such that the fiber sensor intimately engages the bearing ring. Due to the clamping force, relative movement of the fiber sensor can be reduced.

15 Claims, 4 Drawing Sheets

(51) Int. Cl.
*G01L 1/24* (2006.01)
*G01L 5/00* (2006.01)
*G01B 11/16* (2006.01)
G02B 6/36 (2006.01)
G01D 11/02 (2006.01)

(56) References Cited

U.S. PATENT DOCUMENTS

| | | | | |
|---|---|---|---|---|
| 7,263,901 B2* | 9/2007 | Pecher | ............. | G01P 3/44 |
| | | | | 384/50 |
| 8,195,015 B2* | 6/2012 | Becker | ............. | G01B 11/18 |
| | | | | 356/138 |
| 8,790,013 B2* | 7/2014 | Reedman | ............. | G01D 5/35303 |
| | | | | 384/448 |
| 2006/0257060 A1* | 11/2006 | Gempper | ............. | G01L 5/0019 |
| | | | | 384/448 |
| 2010/0158434 A1 | 6/2010 | Becker | | |

* cited by examiner

FIBER SENSOR ASSEMBLY

CROSS REFERENCE TO RELATED APPLICATIONS

This is a U.S. National Stage Application claiming the benefit of International Application Number PCT/EP2012/075555 filed on 14 Dec. 2012 (14 Dec. 2012), which is incorporated herein by reference in its entirety. The 30 month anniversary of the filing date of the International Patent Application is 14 Jun. 2012 (14 Jun. 2015), which falls on a Sunday. Therefore, Applicant is afforded until the next business day (Monday, 15 Jun. 2015) to file the National Stage Application.

FIELD OF THE INVENTION

The invention relates to a bearing comprising a fiber sensor assembly and furthermore to a method for connecting such a fiber sensor to a bearing.

DESCRIPTION OF THE RELATED ART

Bearings are a very important component in rotating machinery. If a bearing fails, then the functionality of the machinery can break down. In some applications it can be very difficult or extremely expensive to replace a failed bearing outside regular scheduled maintenance. Such applications include deep sea applications, ships or continuous manufacturing lines. In an attempt to predict when a bearing needs to be replaced before failure, condition monitoring is done. If the machinery and bearings are in a location that is easily accessible, then the condition of a bearing can be assessed by, for example, vibration measurement. For equipment which is not easily accessible, such as deep sea applications, other means are needed to assess the condition of a bearing to be able to determine when maintenance and/or replacement is required.

For diagnosis of the state of bearing rings and for detecting load states and stresses of the bearing, it is helpful to dynamically detect the deformation of the bearing. One way of dynamic detection is the use of fiber-optic sensors. The use of such sensors is described in American patent application US2010/0158434. The fiber-optic sensor comprises a glass fiber, which is fixed in or to the periphery of the bearing ring. The sensor is attached in a groove around the bearing ring by means of a cement connection. Alternatively, the sensor can be attached by a glue connection. One disadvantage of such connections is that the fiber-optic sensor does not directly contact the surface of the bearing ring being monitored, which may reduce measurement accuracy. Using a cement connection may require the use of high temperature treatment to establish a firm connection between the bearing ring and the fiber sensor. However, the use of high temperatures may cause thermal damage to the fiber sensor.

It would therefore be desirable to provide an alternative bearing ring construction that alleviated at least some of the perceived inconveniences of the prior art.

BRIEF SUMMARY OF THE INVENTION

According to the invention there is provided a bearing comprising a bearing ring and rolling elements, whereby the bearing ring comprises an outer surface with a groove around its circumference accommodating a fiber sensor, the bearing further comprising a clamping element, engaging the fiber sensor with a clamping force acting in a radial direction of the bearing ring such that the fiber sensor intimately engages the bearing ring. Due to the clamping force, relative movement of the fiber sensor may be reduced. Preferably, clamping occurs with direct contact to the surface of the bearing ring, i.e. without an additional layer between the fiber sensor and the bearing ring surface, increasing the accuracy of subsequent deformation measurements. Furthermore, the presence of the clamping force obviates the necessity for a connection layer during use of the bearing ring. Such a connection layer can deteriorate during use, thereby influencing the quality of the deformation measurements in an adverse way. Additionally, the use of a groove and a clamping element provides easy implementation of mass production of a bearing with a fiber sensor such as a fiber-optic sensor, since the size of the groove may be predefined by the diameter of the fiber sensor and the manufacturing process can be standardized.

The bearing may include any suitable rolling elements, including ball bearings, roller bearings, needle bearings and the like. In general, the invention will be applicable to bearings having an inner and an outer bearing ring, with roller elements located between the inner and outer bearing rings, which may be provided with suitable raceways. It will be understood that the invention may also be applicable to journal bearings and other devices in which rolling or even sliding contact with a bearing ring occurs.

According to an embodiment, the bearing ring comprises a channel for accommodating the clamping element for clamping the fiber sensor within the groove. Such a channel has been shown to be advantageous in increasing the sensitivity of the sensor by reducing the material thickness of the bearing ring between the sensor and the rolling elements. The channel may be formed by two channel sidewalls comprising areas of increased thickness around the circumference of the bearing ring, either continuously or intermittently. The channel sidewalls can either be positioned at each edge of the bearing ring or at a distance from the edge of the bearing ring, or a combination thereof.

According to a further alternative embodiment, the clamping ring may comprise an engagement arrangement for engaging with the channel. The engagement arrangement may itself ensure the requisite clamping force or may act together with a tightening arrangement. In one configuration, the clamping ring may have a form-fit engagement with the channel, e.g. by an interference fit within the channel sidewalls.

Preferably, the groove has an opening or entry with a width equal or greater than the diameter of the fiber sensor, whereby the width of the groove decreases with depth. In this manner, a clamping force on the fiber sensor by the clamping element in an axial direction of the bearing ring may be obtained. The groove can comprise sidewalls defining the width of the groove. These sidewalls can be formed such that the width of the groove decreases with increasing distance from the outer surface of the bearing ring, e.g. into the bearing ring. The connection of the fiber sensor within the groove can be increased by adding a component in the axial direction of the bearing ring to the clamping force. In this way, the fiber sensor is not only stabilized with respect to the bearing ring in a radial direction by clamping of the fiber sensor against the surface of the bearing ring, but also in an axial direction by clamping of the fiber sensor against the sidewalls of the bearing ring. In order that the fiber sensor can be inserted into the groove and clamped against the sidewalls of the bearing ring, a first part of the groove has a width equal or greater than the diameter of the fiber sensor and a second part of the groove has a width smaller than the diameter of the fiber sensor. It will be understood that the fiber sensor should preferably not be inserted further into the groove beyond the point where it is level with the outer surface of the bearing ring. Nevertheless, the skilled person will understand it may be possible to provide a ridge on an engaging surface of the clamping ring in order to engage the fiber sensor within the groove. It is also not excluded that both surfaces have a partial groove and that the fiber is held between the opposing grooves. Most preferably, the groove and the clamping element are sized with respect to the fiber sensor to ensure a close fit with a predefined pressure applied to the fiber sensor.

According to a further embodiment, at least part of the cross-section of the groove forms a linear shape, such as a V-shape or an isosceles trapezoid. The linear part of the cross-section forms inclined sidewalls, thereby decreasing the width of the groove with increasing depth. In addition or alternatively, at least part of the cross-section of the groove forms a curved shape, such as a parabola, semi-circle, semi-ellipse or the like.

The length of the groove may be any length sufficient to provide the desired sensing function. The groove may extend once around the full circumference of the outer surface or may extend only over part of the circumference. The groove may also make more than a single turn and may be serpentine or doubled-back on itself.

The fiber sensor may be any suitable fiber capable of measuring the state of the bearing. The skilled person will be familiar with various forms of sensors, working on the basis of strain, stress, elongation, temperature and the like. Preferably, the fiber sensor is an optical fiber, more preferably a fiber Bragg grating (FBG) sensor. A light signal generated by a light source is injected into the optical fiber, for example a glass fiber. The light signal is detected by a detector after passing through the optical fiber. When the optical fiber is longitudinally deformed, this can be determined by a change of at least one parameter of the detected light signal passed through the optical fiber. Correspondingly, a radial deformation of the bearing ring from this longitudinal deformation of the optical fiber is determined. Spatial resolution in the longitudinal direction of the sensor is achieved by a corresponding variation of the grating period, resulting in different Bragg wavelengths due to the variation of the grating period over the length of the sensor.

The sensor can be attached at the side of the bearing ring facing away from the rolling bodies, preferably at the radially outer surface of the outer bearing ring. Nevertheless, the skilled person will recognize that a location at the radially inward surface of the inner bearing ring may also be considered. The sensor is preferably attached directly opposite the raceway along which the rolling bodies move. The sensor will generally be provided on the stationary bearing ring. However, it is also possible to provide the sensor on the rotating bearing ring.

Clamping of the fiber sensor into the groove can be provided by various forms of clamping element. In one embodiment, the clamping element may be provided by the outer housing in which the bearing is received. According to a preferred embodiment however, the clamping element comprises an annular clamping ring. The clamping ring is provided around the circumference of the bearing ring, exerting a clamping force on the fiber sensor and the surface of the first side of the bearing ring. If a channel is provided around the circumference of the bearing ring, the clamping ring can be accommodated in that channel. The ring may be a complete ring or a C-clip type ring. The skilled person will be well aware of a wide variety of clamping elements that could provide this function, including circlips, hose clamps, screw clips, spring clips, shape-memory alloy rings, shrink-fit elements and the like.

The invention also encompasses a method for connecting a fiber sensor to a bearing, comprising a bearing ring and rolling elements, whereby the bearing ring comprises an outer surface, the method comprising: providing a groove along at least part of the circumference of the outer surface of the bearing ring, the groove having a width dimension parallel to an axial direction of the bearing ring and a height dimension parallel to a radial direction of the bearing ring, inserting a fiber sensor into at least part of the groove, mechanically clamping the fiber sensor within the groove, such that the fiber sensor intimately engages the bearing ring with a clamping force over that part of the groove in which it is inserted.

The groove can be provided in either the inside of the inner bearing ring or the outside of the outer bearing ring. In addition, the groove can be provided at either the stationary or the rotating ring. The width and height dimensions of the groove are such that the fiber sensor can be at least partly accommodated in the groove. Before inserting the fiber sensor in the groove it is possible that a temporary connection layer is provided at the fiber sensor or the groove or both. This connection layer should have disappeared, either by deterioration or by evaporation, at least upon use of the bearing and the fiber sensor, preferably after assembly. The clamping element is furnished over at least the fiber sensor, such that the clamping element can exert a clamping force onto the fiber sensor. Additionally, the clamping element can extend over at last part of the first surface of the bearing ring. The fiber sensor is then connected to the surface of the first side by the clamping force. This results at least in use in a direct contact of the fiber sensor with the surface of the first side of the fiber sensor.

According to an embodiment, the method comprises providing a channel around at least part of the circumference of the first side of the bearing ring, whereby the groove is provided in the channel, such that the clamping element for clamping the fiber sensor into the groove is accommodated in the channel.

According to another embodiment, the method comprises providing the groove with an opening having a width equal or greater than the diameter of the fiber sensor, whereby the width of the groove decreases with depth, such that a clamping force on the fiber sensor by the clamping element in an axial direction of the bearing ring is obtained.

Preferably, the groove in cross-section comprises one of the group of a V-shape, an isosceles trapezoid and a semi-ellipse or a combination thereof.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
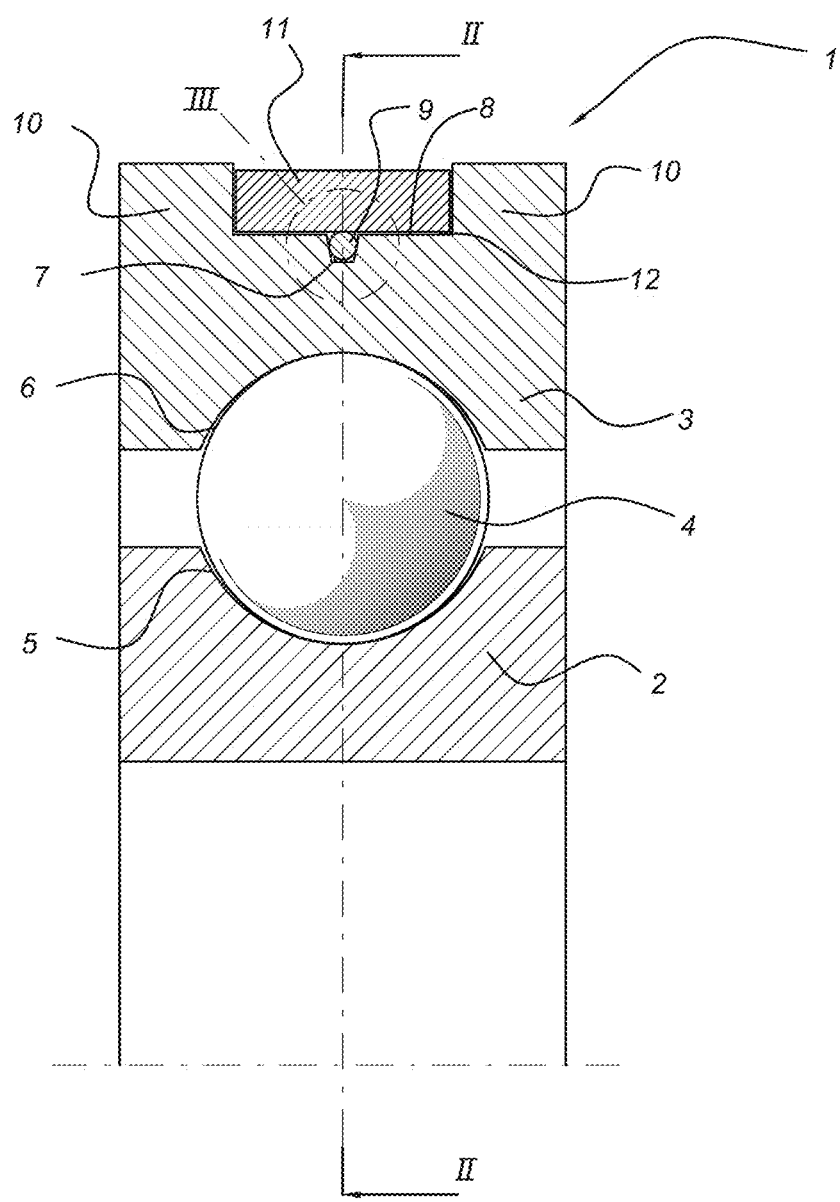
FIG. 1 shows an axial cross-section of a bearing according to an embodiment of the present invention.

FIG. 1 shows an axial cross-section of a bearing 1 comprising an inner bearing ring 2 having an inner raceway 5, and an outer bearing ring 3 having an outer raceway 6. In between the inner and outer rings 2, 3, rolling elements 4 are provided such that the inner and outer bearing rings 2, 3 can rotate with respect to each other. The rolling elements 4 are located in between the inner and outer raceways 5, 6.

A groove 7 is provided at an outer surface 8 of the outer bearing ring 3. The groove 7 accommodates a fiber sensor 9, comprising an optical fiber. In its turn, the groove 7 is provided within a channel 12. The channel 12 is shaped as a recess between two sidewalls 10 forming an increase in thickness of the outer bearing ring 3.

Figure 3:
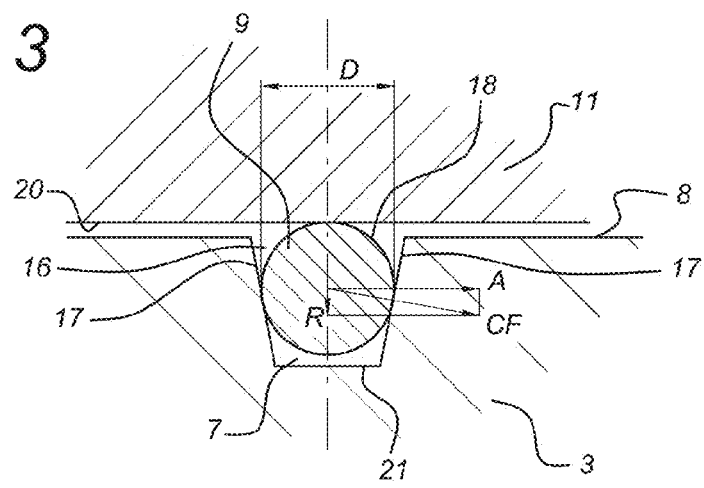
FIG. 3 shows a detail of the bearing of FIG. 1 indicated by III.

The fiber sensor 9 is accommodated in the groove 7 and connected to the outer bearing ring by means of a clamping ring 11. The clamping ring 11 is accommodated in the channel 12. Clamping ring 11 exerts a clamping force CF onto the fiber sensor 9, as shown in FIG. 3.

Figure 2:
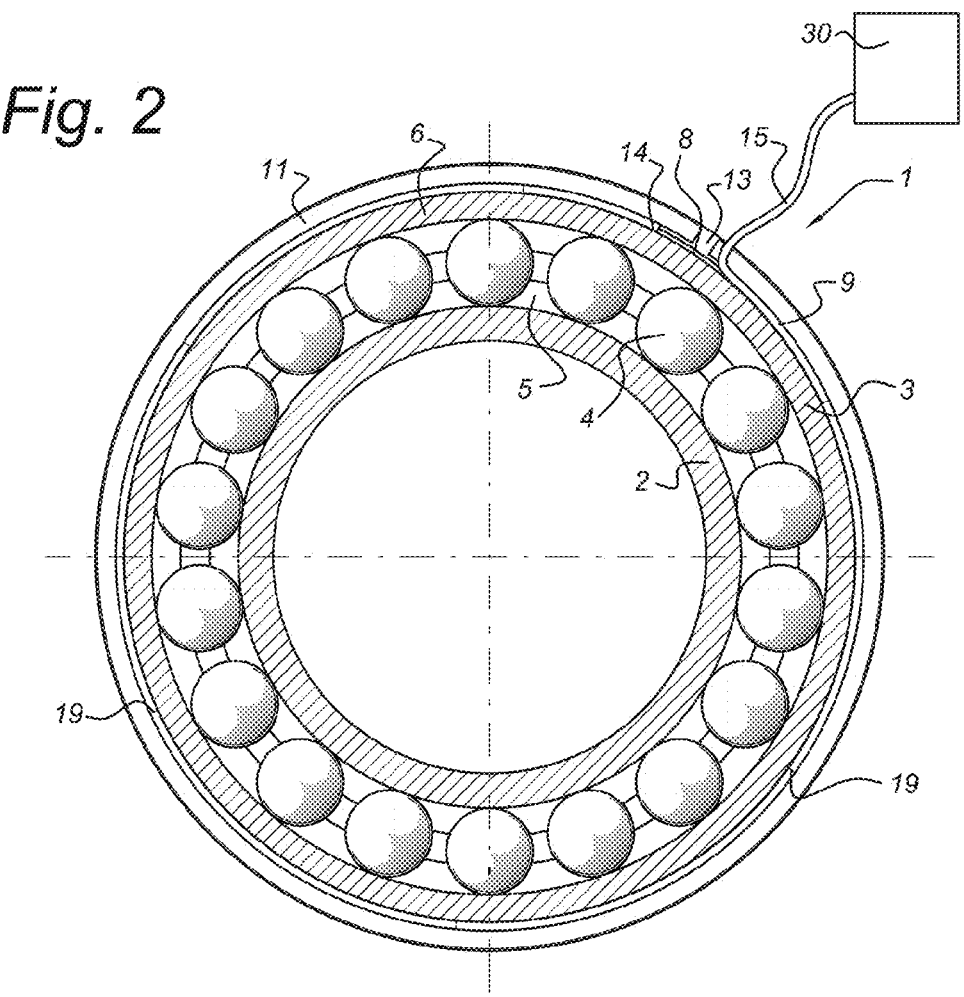
FIG. 2 shows a radial cross-section of the bearing of FIG. 1.

FIG. 2 shows a radial cross-section of the bearing 1. The clamping ring 11 is provided around a large part of the circumference of the outer bearing ring 3, except for a relatively small portion forming an opening 13, which is used for placing the clamping ring 11 over the fiber sensor 9 and into the channel 12.

The fiber sensor 9 is accommodated within the groove 7, over essentially the full circumference of the outer bearing ring 3 from a first end 14 to a second end 15. The second end 15 extends from the bearing 1 and can be connected to a suitable detector assembly 30.

The bearing 1 is manufactured by providing the groove 7 in the outer surface 8 of the outer bearing ring 3. The groove 7 has a tapered cross-section extending into the outer bearing ring 3, from the outer surface 8. The fiber sensor 9 is put in the groove 7, upon which the clamping ring 11 is snapped over the outer bearing ring 3. In order to maintain the fiber sensor 9 at its location, a temporary fixation can be provided, such as a glue that evaporates or disintegrates during the remainder of the assembly process. When the bearing 1 is ready for use, this temporary fixation should preferably have disappeared, such that a direct contact between the fiber sensor 9 and the groove 7 is established. The fiber sensor 9 comprises an optical fiber with fiber Bragg gratings 19. This is a type of distributed Bragg reflectors constructed in a short segment of the optical fiber that reflects particular wavelengths of light and transmits all others. This is achieved by creating a periodic variation in the refractive index of the fiber core, which generates a wavelength specific dielectric mirror. The fiber Bragg grating is therefore used as an inline wavelength-specific reflector. Operation of such a sensor is generally conventional and will not be discussed further in the present application.

FIG. 3 shows a detail of the bearing 1 of FIG. 1 indicated by III. The tapered shape of the groove 7 is clearly shown. The width of the entry 16 of the groove 7 is larger than the diameter D of the fiber sensor 9, which in turn is wider than a base 21 of the groove 7. Due to the tapered shape, the sidewalls 17 of the groove 7 grip the fiber sensor 9 at its periphery 18. The groove 7 and fiber 9 are dimensioned specifically such that on insertion of the fiber 9 into the groove 7, the inner surface 20 of the clamping ring 11 is tangential to the periphery 18 of the fiber 9. After providing the clamping ring 11, a clamping force CF is exerted onto the fiber sensor 9. Due to the inclined sidewalls 17 of the groove 7, the clamping force CF has an axial component A and a radial component R.

Figure 4:
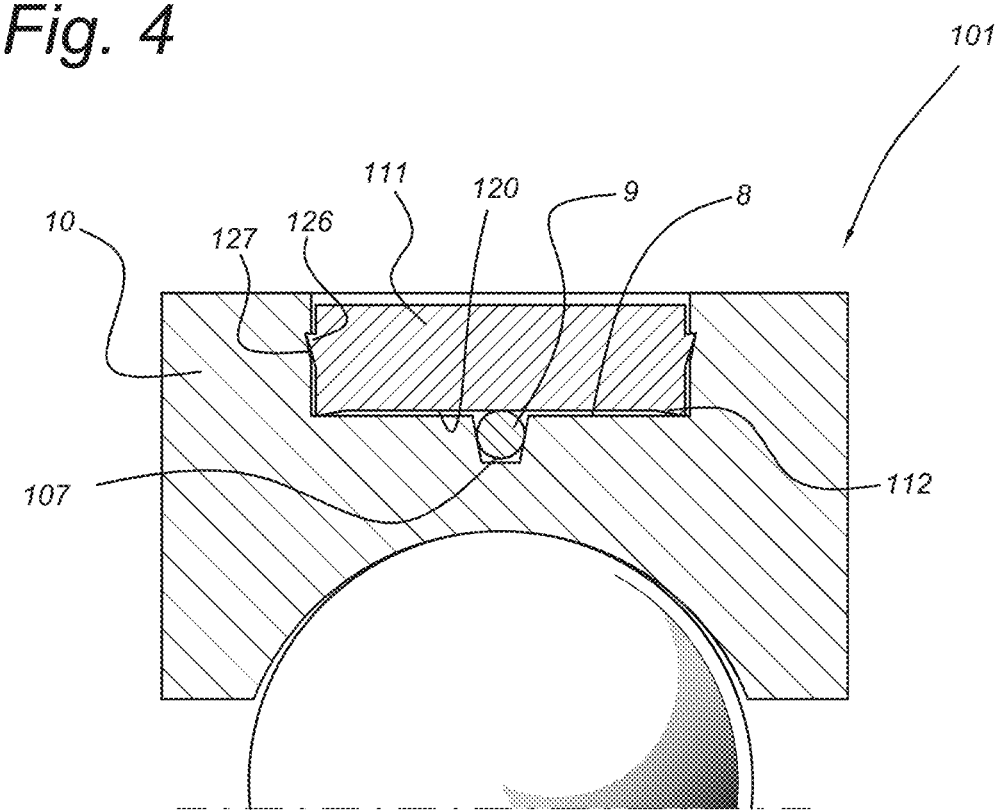
FIG. 4 shows an alternative embodiment of the invention in axial cross-section.

FIG. 4 shows a bearing 101 according to an alternative embodiment of the invention in axial cross-section with an alternative clamping ring 111. Clamping ring 111 is distinguished from that of the first embodiment by a pair of shoulders 112 extending around the inner circumference. As can be seen in FIG. 4, the shoulders 112 serve to determine the degree of clamping of the fiber sensor 9. The fiber sensor 9 is thus partially received in groove 107 and partially received by the recessed inner surface 120 of the clamping ring 111. It will be understood that other shapes of clamping element and channel may be provided to achieve the same effect.

Figure 5:
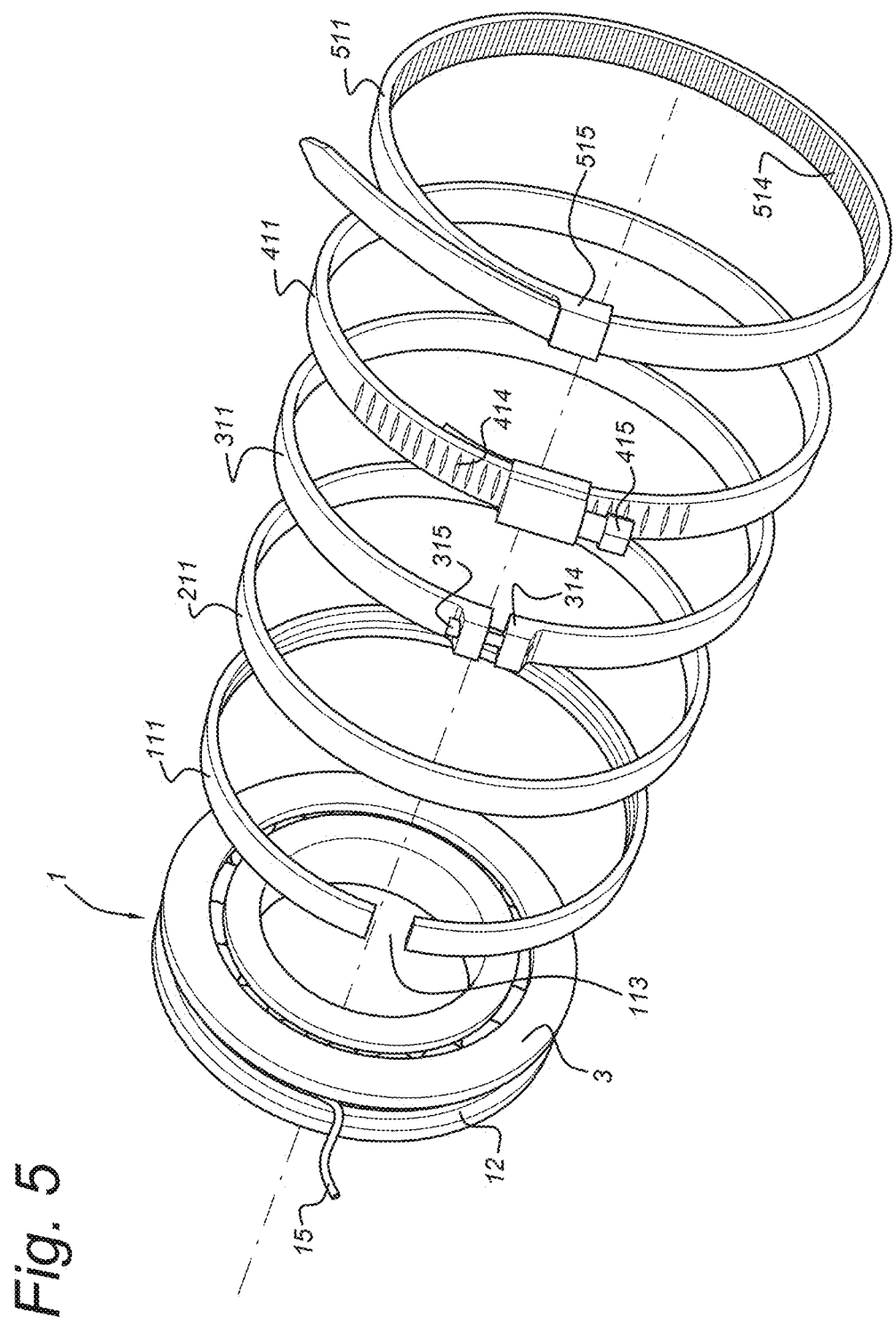
FIG. 5 shows a bearing according to the invention in perspective view with alternative clamping rings.

FIG. 5 shows the bearing 1 of FIGS. 1 to 3 in perspective view with a number of different clamping rings. Clamping ring 111 as shown in FIG. 4 is formed to have an opening 113 allowing the ring 111 to be slipped over the outer bearing ring 3 and into the channel 12. Clamping takes place by the inherent spring properties of the ring 111, which is made of spring steel.

Clamping ring 211 is a complete circumferential ring made of elastic material. It can be slipped over the outer bearing ring 3 by stretching and is retained in the channel 12 by its natural resilience.

Clamping ring 311 is of a screw clamp type, having a pair of flanges 314, that can be drawn to each other by a screw 315. It will be understood that the clamping ring 311 and bearing 1 are shown schematically and that in reality, the flanges 314 will be of a size that they fit within the channel 12.

Clamping ring 411 is of a hose clamp type, having a captive screw 415 that engages with thread sections 414 formed along the ring 411.

Clamping ring 511 is of a cable-tie type. It is formed of plastic and has a ratchet element 515 that engages with serrations 514 formed on the inner surface of the ring 511. The skilled person will recognize that many other alternative forms of clamping ring may be implemented.

Thus, the invention has been described by reference to the embodiment discussed above. It will be recognized that this embodiment is susceptible to various modifications and alternative forms well known to those of skill in the art without departing from the spirit and scope of the invention. In particular, it will be understood that although a single groove and fiber sensor has been described, multiple grooves and or multiple fibers could be incorporated. Accordingly, although specific embodiments have been described, these are examples only and are not limiting upon the scope of the invention.

The invention claimed is:

1. A bearing comprising:
   a bearing ring supporting a plurality of rolling elements, the bearing ring comprising an outer surface;
   a groove around a circumference of the outer surface, wherein the groove accommodates a fiber sensor; and
   a clamping element, wherein the clamping element engages the fiber sensor with a clamping force acting in a radial direction of the bearing ring such that the fiber sensor intimately engages the bearing ring.

2. The bearing according to claim 1, the bearing ring further comprises a channel for accommodating the clamping element, the groove being located within the channel.

3. The bearing according to claim 1, wherein the groove has an entry with a width one of equal to or greater than a diameter of the fiber sensor, wherein the width of the groove decreases with increasing depth, such that a clamping force on the fiber sensor by the clamping element in an axial direction of the bearing ring is obtained.

4. The bearing according to claim 3, wherein at least part of the width of the groove decreases linearly with depth.

5. The bearing according to claim 3, whereby at least part of the width of the groove decreases with depth in a paraboloidal manner.

6. The bearing according to claim 1, wherein the fiber sensor is an optical fiber.

7. The bearing according to claim 6, wherein the optical fiber comprises a fiber Bragg grating (FBG) sensor.

8. The bearing according to claim 1, whereby the clamping element comprises a clamping ring.

9. A method for connecting a fiber sensor to a bearing, the bearing comprising a bearing ring and rolling elements, whereby the bearing ring comprises an outer surface, the method comprising steps of:
providing a groove along at least part of a circumference of the outer surface of the bearing ring, the groove having a width dimension parallel to an axial direction of the bearing ring and a depth dimension parallel to a radial direction of the bearing ring,
inserting a fiber sensor into at least part of the groove,
mechanically clamping the fiber sensor within the groove, such that the fiber sensor intimately engages the bearing ring with a clamping force over that part of the groove in which it is inserted.

10. The method according to claim 9, further comprising a step of: providing a clamping element for clamping the fiber sensor into the groove.

11. The method according to claim 10, the method further comprising a step of: providing a channel around at least part of the circumference of the outer surface of the bearing ring, whereby the groove is provided in the channel and the clamping element is accommodated in the channel.

12. The method according to claim 9, the method further comprising a step of: providing the groove with an entry having a width of one of equal to or greater than a diameter of the fiber sensor, wherein the width of the groove decreases with depth, such that the clamping force on the fiber sensor acts in a radial direction of the fiber sensor.

13. The method according to claim 12, wherein the groove in cross-section comprises one of the group of a V-shape, an isosceles trapezoid and a semi-ellipse or a combination thereof.

14. The method according to claim 9, wherein the fiber sensor is an optical fiber.

15. The method according to claim 14, wherein the fiber sensor comprises a fiber Bragg grating (FBG) sensor.

\* \* \* \* \*